United States Patent
Kuehler et al.

(10) Patent No.: US 8,688,624 B2
(45) Date of Patent: Apr. 1, 2014

(54) SEED DATA AUTOMATION

(75) Inventors: William A. Kuehler, Sanatoga, PA (US); Valerian Fuchs, Old Bridge, NJ (US); Ramya Raj, Chennai (IN); Apurva M. Patel, Belle Mead, NJ (US)

(73) Assignee: Bank of America Corporation, Charlotte, NC (US)

( * ) Notice: Subject to any disclaimer, the term of this patent is extended or adjusted under 35 U.S.C. 154(b) by 149 days.

(21) Appl. No.: 13/221,079

(22) Filed: Aug. 30, 2011

(65) Prior Publication Data

US 2013/0054626 A1    Feb. 28, 2013

(51) Int. Cl.
*G06F 7/00* (2006.01)
*G06F 17/30* (2006.01)

(52) U.S. Cl.
USPC .......................................... 707/602; 707/804

(58) Field of Classification Search
USPC .......................................... 707/602, 756, 804
See application file for complete search history.

(56) References Cited

U.S. PATENT DOCUMENTS

| | | | |
|---|---|---|---|
| 6,032,159 A | 2/2000 | Rivlin | |
| 6,604,110 B1* | 8/2003 | Savage et al. | 707/602 |
| 7,337,176 B1 | 2/2008 | Cheedella et al. | |
| 7,822,710 B1* | 10/2010 | Miller et al. | 707/620 |
| 2002/0095436 A1 | 7/2002 | Lee | |
| 2005/0091251 A1* | 4/2005 | Ramarao | 707/101 |
| 2005/0187974 A1* | 8/2005 | Gong | 707/104.1 |
| 2007/0239769 A1* | 10/2007 | Fazal et al. | 707/102 |
| 2010/0114841 A1* | 5/2010 | Holenstein et al. | 707/690 |
| 2010/0280990 A1* | 11/2010 | Castellanos et al. | 707/602 |
| 2011/0047525 A1* | 2/2011 | Castellanos et al. | 717/104 |

OTHER PUBLICATIONS

Casati et al. "A Generic solution for Warehousing Business Process Data". Sep. 2007. VLDB '07 Proceedings of the 33rd international conference on Very large date bases, pp. 1128-1137.*

* cited by examiner

*Primary Examiner* — James E Richardson
(74) *Attorney, Agent, or Firm* — Michael A. Springs

(57) ABSTRACT

According to one embodiment of the present invention, the automated loading seed data for testing in a product integration environment includes receiving input data associated with a test session. The input data may be received in a first format that includes at least one object. A processor may be used to automatically convert the input data into a second format that includes the metadata data string. The metadata data string may then be loaded into a database.

11 Claims, 3 Drawing Sheets

SEED DATA AUTOMATION

TECHNICAL FIELD OF THE INVENTION

This invention relates generally to the loading of test data into a product integration environment and, more specifically, to seed data automation in a product integration environment.

BACKGROUND

Prior to the testing of a product in a product integration environment, test data must be loaded into the database. Typically, the process for loading test data is a manual one that includes receiving one or more seed data files in standard format, and loading them individually into a database using an Extract, Transform, Load (ETL) tool. As each file is successfully loaded into the database, a success notification is received and the file is updated with the newly assigned record identifiers. The record identifiers must then be manually associated with each subsequent, related seed data file.

For example, if the seed data is associated with a contact management application, the data may include a list of companies and a list of employees associated with each company. Before the employee files can be uploaded to the database, the appropriate company file must be first loaded. After a record identification number is assigned to each company record in the company file, the record identification number must be manually copied and pasted into each employee record within the employee file. Then each employee file is individually loaded into the database. Because the loading of the seed data requires a user to manually update and load each seed data file, the loading of the seed data is a labor intensive and error prone process.

SUMMARY OF THE DISCLOSURE

In accordance with the present invention, disadvantages and problems associated with loading seed data for testing in a product integration environment may be reduced or eliminated.

According to one embodiment of the present invention, the automated loading of seed data for testing in a product integration environment includes receiving input data associated with a test session. The input data may be received in a first format that includes at least one object. A processor may be used to automatically convert the input data into a second format that includes at least one metadata data string. The metadata data string may then be loaded into a database.

Certain embodiments of the invention may provide one or more technical advantages. For example, as stated above, a technical advantage of one embodiment may be that manual manipulation of the seed data occurs only once. Because the metadata is stored when it is originally loaded for a user or test session and then can be reused, the data is manipulated only when the input data is received rather than each time a filed is loaded for each user. As a result, a technical advantage may be that test data may be repeatedly loaded in a more efficient manner and with minimal risk of human error. Another technical advantage may be that the user interface enabling automated loading of test data may allow a testing team to load test data without engaging administrators. Additionally or alternatively, because the automated seed data loader may be built within the same application that is used for performing the tests of the seed data, no additional software may be required.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
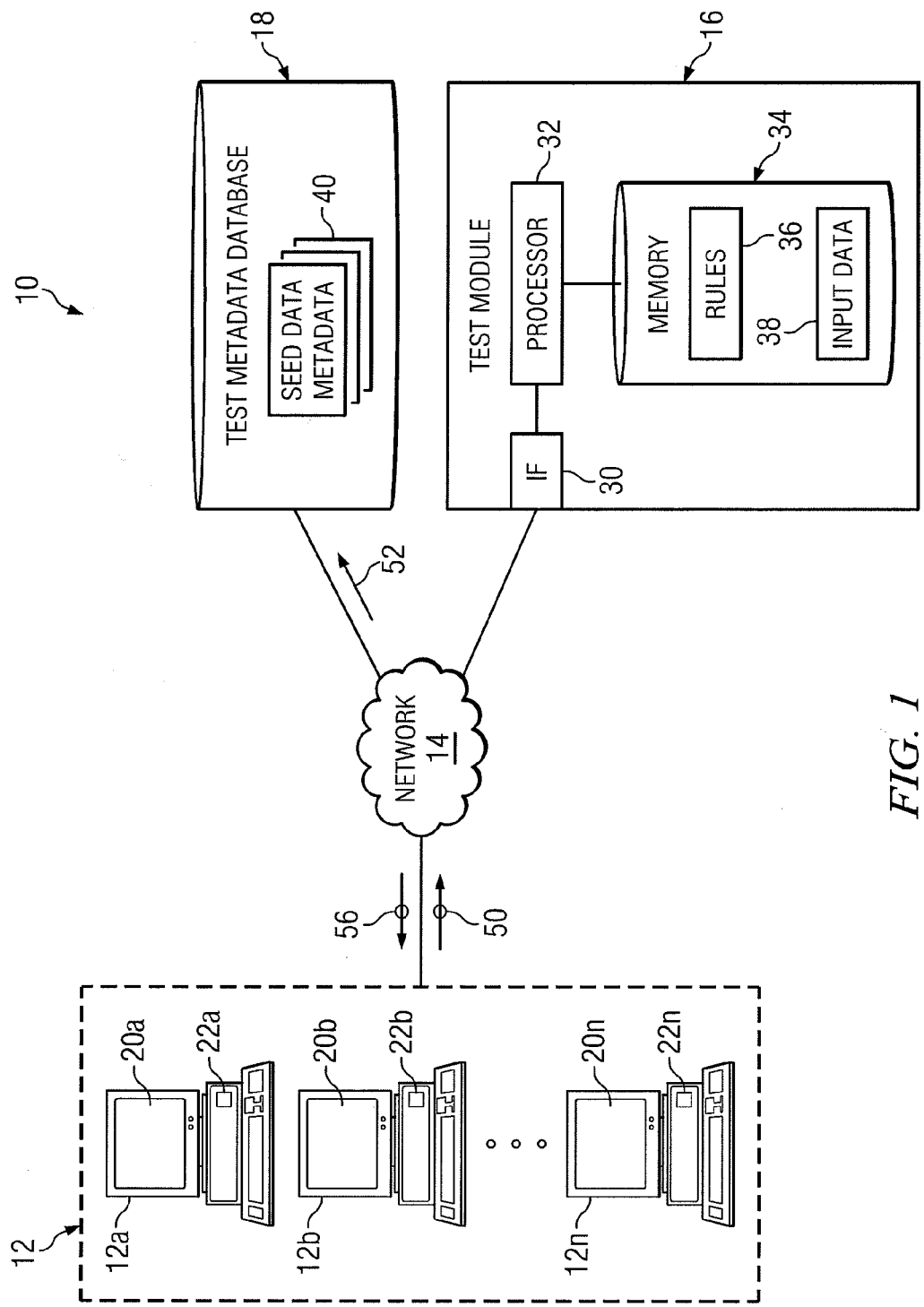
FIG. 1 illustrates a system for the automated loading of seed data for testing in a product integration environment.
Figure 2:
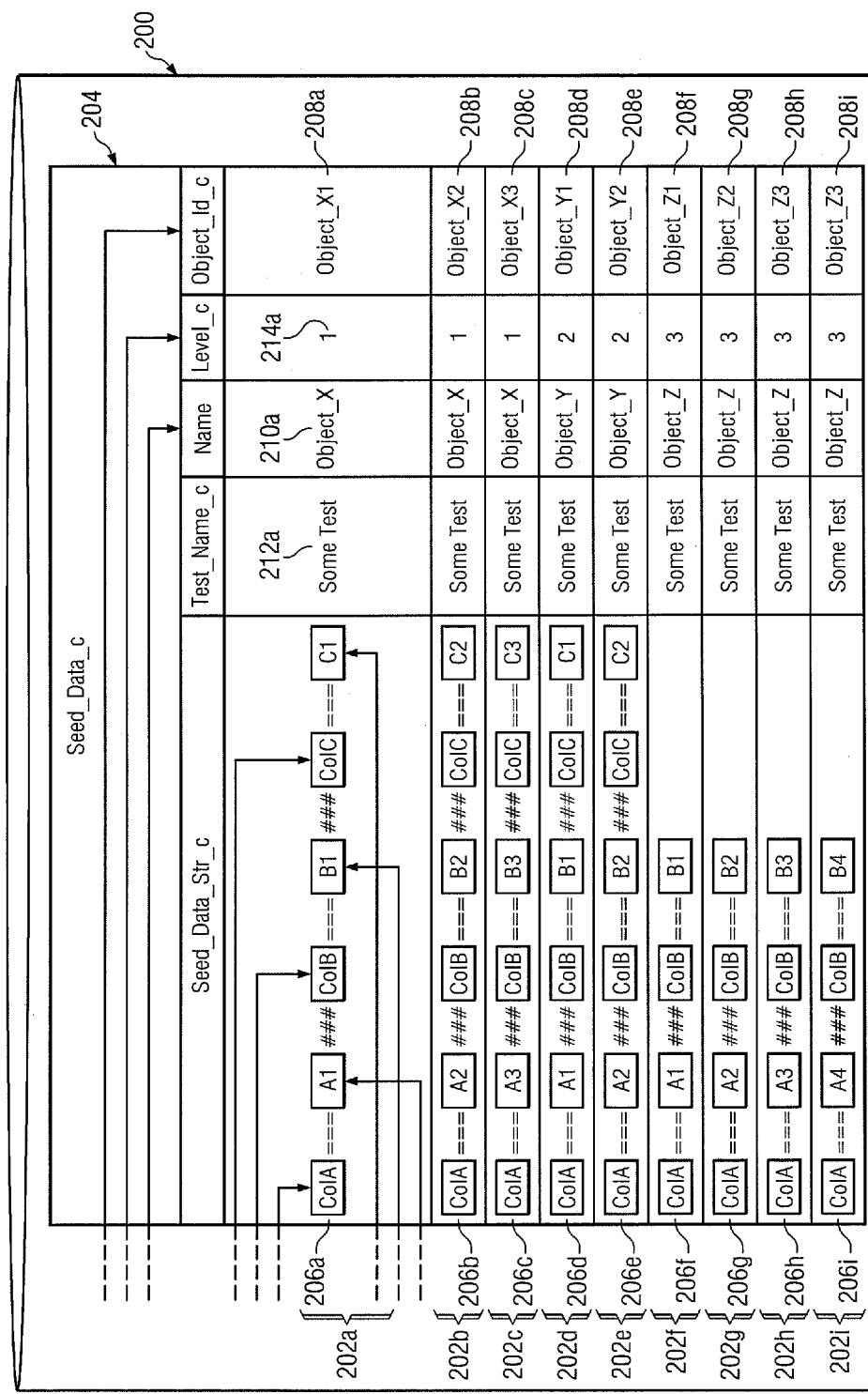
FIG. 2 illustrates a particular embodiment of test metadata database used for the automated loading of seed data for testing in a product integration environment.
Figure 3:
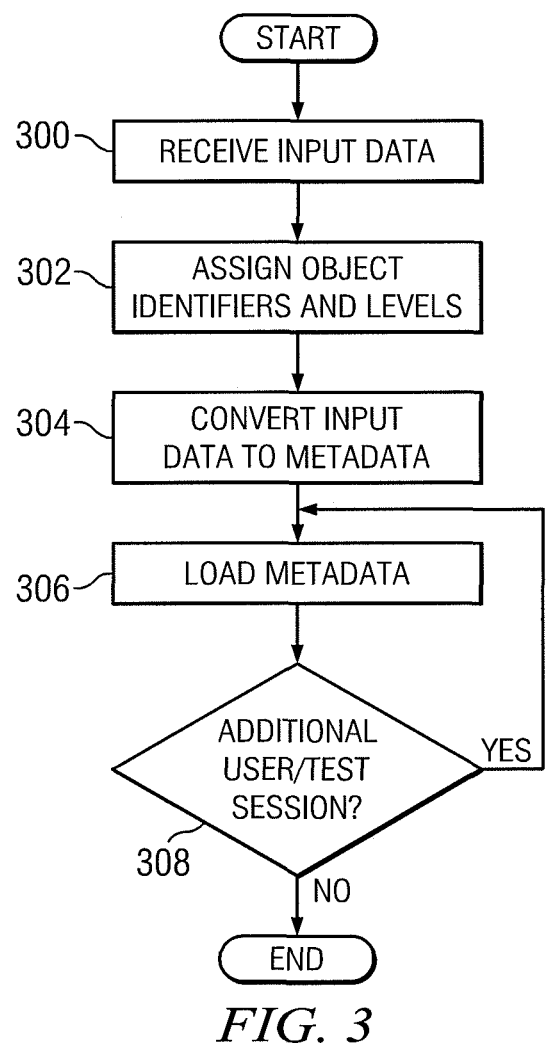
FIG. 3 illustrates a flowchart for the automated loading of seed data for testing in a product integration environment.

Embodiments of the present invention and its advantages are best understood by referring to FIGS. 1 through 3, like numerals being used for like and corresponding parts of the various drawings.

FIG. 1 illustrates a system 10 that the automated loading of seed data for testing in a product integration environment. System 10 includes one or more computers 12 that communicate over one or more networks 14 to facilitate the loading of seed data for testing in a product integration environment. Computer 12 interacts with test module 16 to load test data into database 18 and to conduct testing with test data in a product integration environment.

Prior to testing in a product integration environment, the seed data must be loaded into the database. Conventional systems for loading test data require that a user manually select and load each file and in some cases update each file with a high-level identifier assigned by the database tool before it can be loaded to the database. For example, if the seed data is associated with a contact management application, the data might include a list of companies and a list of employees associated with each company. Typically, the appropriate company file must be successfully loaded and each record in the employee file modified to refer to the loaded records in the company file before it can be manually loaded to the database. Because the loading of the seed data requires a user to manually update and load each seed data file, the loading of the seed data is a labor intensive and error prone process. The teachings of the disclosure recognize that it would be desirable to provide an automated system for loading seed data to the database. As will be described in more detail below, the seed data files may be transformed into key-value pair format. Further each data record may be associated with an object identifier and a level. Seed data records may be processed and loaded into database 18 in the order of their associated levels. In a particular embodiment, each level may be associated with an object type.

System 10 includes computers 12a-12n, where n represents any suitable number, that communicate with test module 16 through network 14. Computer 12 may include a personal computer, a workstation, a laptop, a wireless or cellular telephone, an electronic notebook, a personal digital assistant, or any other device (wireless, wireline, or otherwise) capable of receiving, processing, storing, and/or communicating information with other components of system 10. A user of computer 12 may initiate the testing of data in a product integration environment. In a particular embodiment, the user initiates the testing when the user of computer 12 transmits data to test module 16 for loading to database 18. Computer 12 may also comprise a user interface, such as a display, a microphone, keypad, or other appropriate terminal equipment usable by a user.

In the illustrated embodiment, computer 12 includes a graphical user interface ("GUI") 20 that displays information to the user. GUI 20 is generally operable to tailor and filter data entered by and presented to the user. GUI 20 may provide the user with an efficient and user-friendly presentation of information. For example, GUI 20 may display test options and results in any suitable format such as a bar graph, a pie chart, a line graph, a chart. As will be described in more detail below, GUI 20 may comprise a plurality of displays having interactive fields, pull-down lists, and buttons operated by the user. GUI 20 may include multiple levels of abstraction including groupings and boundaries. It should be understood that the term GUI 20 may be used in the singular or in the plural to describe one or more GUIs 20 in each of the displays of a particular GUI 20.

Computer 12 also includes an application 22. Application 22 represents any suitable software or logic that allows a user to interact with test module 16 by transmitting requests, information, data, and test files to and from stress test module 16. User 12 may enter access credentials into application 22 to interact with test module 16. In a particular embodiment, for example, the access credentials may include a user name and/or a password.

Network 14 represents any suitable network operable to facilitate communication between the components of system 10, such as stress test module 16 and market database 18. Network 14 may include any interconnecting system capable of transmitting audio, video, signals, data, messages, or any combination of the preceding. Network 14 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Test module 16 represents any suitable component that processes test data for testing in a product integration environment. Test module 16 may include a network server, any suitable remote server, a file server, or any other suitable device operable to communicate with computers 12 and database 18 and receive and process data. In some embodiments, test module 16 may execute any suitable operating system such as IBM's, z/OS, MS-DOS, PC-DOS, MAC-OS, WINDOWS, UNIX, OpenVMS, or any other appropriate operating system, including future operating systems. The functions of test module 16 may be performed by any suitable combination of one or more servers or other components at one or more locations. In the embodiment where the modules are servers, the servers may be public or private servers, and each server may be a virtual or physical server. The server may include one or more servers at the same or at remote locations. Also, test module 16 may include any suitable component that functions as a server. In the illustrated embodiment, test module 16 includes a network interface 30, a processor 32, and a memory 34.

Network interface 30 represents any suitable device operable to receive information from network 14, transmit information through network 14, perform suitable processing of the test data, communicate to other devices, or any combination of the preceding. For example, network interface 30 receives requests and test data from computer 12. Network interface 30 may also operate to transmit test data through network 14 and load test data in test database 18. Network interface 30 represents any port or connection, real or virtual, including any suitable hardware and/or software, including protocol conversion and data processing capabilities, to communicate through a LAN, WAN, or other communication system that allows test module 16 to exchange information with network 14, computers 12, test database 18, or other components of system 10.

Processor 32 communicatively couples to network interface 30 and memory 34, and controls the operation and administration of test module 16 for the processing of information received from network interface 30 and memory 34. Processor 32 includes any hardware and/or software that operates to control and process information. Processor 32 may be a programmable logic device, a microcontroller, a microprocessor, any suitable processing device, or any suitable combination of the preceding. In a particular embodiment, processor 32 may executes logic associated with seed data automation rules 36 to control conversion of seed data into database metadata and the loading of the database metadata into test database 18. For example, in a particular embodiment, processor 32 may receive seed data in a standard .csv format and then convert the seed data to database metadata for storage in test database 18.

Memory 34 stores, either permanently or temporarily, data, operational software, or other information for processor 32. Memory 34 includes any one or a combination of volatile or non-volatile local or remote devices \suitable for storing information. For example, memory 34 may include random access memory (RAM), read only memory (ROM), magnetic storage devices, optical storage devices, or any other suitable information storage device or a combination of these devices. While illustrated as including particular modules, memory 34 may include any suitable information for use in the operation of test module 16.

In the illustrated embodiment, memory 34 includes seed data automation rules 36. Seed data automation rules 36 generally refer to logic, rules, standards, policies, limitations, tables, and/or other suitable instructions for loading processing the seed data received from a user of computer 12 and for processing the information received from computer 12. Seed data automation rules 36 may also include logic to convert the seed data into database metadata or other suitable logic.

In the illustrated embodiment, memory 34 is also used to, temporarily or permanently, store input data 38. Input data 38 may include input test data in a standard format such as that which is received from the user of computer 12. In one particular embodiment, input data 38 may include one or more .csv files. It is generally recognized, however, that .csv is just one example format, and input data 38 may be received from the user of computer 12 in any appropriate format. Upon receiving the input data 38, processor 32 processes the input data 38 by converting input data 38 into database metadata. The conversion of such test data 38 into metadata is described in more detail below with regard to FIG. 2. Interface 30 of processor 32 is then used to load the converted database metadata into test metadata database 18.

Test metadata database 18 includes any one or a combination of volatile or non-volatile local or remote devices suitable for storing information. For example, Test metadata database 18 may include RAM, ROM, magnetic storage devices, optical storage devices, or any other suitable information storage device or combination of these devices. In the illustrated embodiment, test metadata database, either permanently or temporarily, stores seed data metadata 40. As will be described in more detail below, seed data metadata 40 may include one or more tables storing records associated with the objects of input data 38. In particular, seed data metadata may include a key value pair string that is representative of a rows and column of each object of input data 38.

In an exemplary embodiment of operation, a user interacts with computer 12a to select test data to be uploaded to test metadata database 18. Using application 22, the user submits a request 50 identifying input data 38 on GUI 20. Test module 16 receives request 50 and processes the input data 38 associated with request 50. In particular, test module 16 uses one or more seed data automation rules 36 to convert input data 38 associated with request 50 into seed data metadata 40. User interface 30 is used to transmit a load command 52 to test metadata database 18. In an embodiment, test module 16 communicates a load request 52 that includes converted seed data metadata records 40 to test metadata database 18. Test metadata database 18 then loads the seed data metadata records 40 for testing.

A component of system 10 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 10 without departing from the scope of the invention. For example, system 10 may include any number of computers 12, networks 14, test modules 16, and test metadata databases 18. Any suitable logic may perform the functions of system 10 and the components within system 10. Additionally, though test metadata database 18 is shown as being separate from test module 16, test metadata database 18 may be incorporated into test module 16 in certain embodiments.

FIG. 2 illustrates a particular embodiment of test metadata database 200. As described above, test metadata database 200 stores converted seed data records 202a-i. Though seed data records may include records 202 stored in any organized manner, FIG. 2 depicts test metadata database 200 as storing seed data records 202a-i organized in an exemplary seed data table 204. Further, it is generally recognized that test meta database 200 may include any number of appropriate seed data tables 204 including any number of seed data records 202. As described below, each metadata record 202a-i may be related to an input object, and each metadata record 202a-i may have associated object information provided in specific fields.

For illustrating one exemplary conversion of input seed data to metadata records 202a-i, assume that input data 38 received from computer 12 includes three objects: object X, object Y, and object Z. In particular, assume that test module 16 receives the following three objects from computer 12:

| Object_X.csv | | |
|---|---|---|
| XcolA | XcolB | XcolC |
| A1 | B1 | C1 |
| A2 | B2 | C2 |
| A3 | B3 | C3 |

Object X

| Object Y | | |
|---|---|---|
| Object_Y.csv | | |
| YcolA | YcolB | YcolC |
| A1 | B1 | C1 |
| A2 | B2 | C2 |

| Object Z | |
|---|---|
| Object_Z.csv | |
| ZcolA | ZcolB |
| A1 | B1 |
| A2 | B2 |
| A3 | B3 |
| A4 | B4 |

Upon receiving the input data 38, processor 32 processes the input data 38 by converting input data 38 into database metadata records 202 which are stored as seed data table 204 in test metadata database 200.

The conversion of test data 38 into database metadata records 202 may begin with each object within input test data 38 being assigned an identifier and a level. Assume for example, that in a contact management application scenario, the input test data relates to employee records for various offices of a company. Thus, Object X may comprise a .csv file that includes company information, Object Y may comprise a .csv file that includes office location information, and Object Z may comprise a .csv file that includes employee information. As such, in this example, Object X may be assigned to level 1 and an object identifier of "Object_X". Likewise, Objects Y and Z may be assigned to levels 2 and 3 and the object identifiers "Object_Y" and "Object_Z", respectively. Each object may then be converted to one or more records 202a-i and processed and loaded into test metadata database 200 in the order of their respective levels. Thus, because Object X relating to the company information is assigned to level 1, Object X may be processed and loaded into test metadata database 200 before Objects Y and Z, which relate to the Office location and employee information, respectively.

The data within each object may then be converted into one or more seed data strings 206a-i using a key-value format. For example, in one particular embodiment, each key-value pair may be entered using a "key===value" format, and a seed data string 206a-i may contain multiple key value pairs associated with an object .csv file. Each key value pair may be separated by "###" such that a record may be entered in the following format:

key1===value1###key2===value2

Returning to the objects described above, for example, a first seed data string 206a may be generated for Object X based on the first row of data contained in object X. Specifically, the first row of Object X may be converted into the following data key-value string:

XcolA===A1###XcolB===B1###XcolC===C1

This seed data string 206a is loaded into seed data table 204 as a first record 202a. As the seed data string 206a is inserted into seed data table 204, a record identifier 208a and a seed data object identifier 210a are inserted into the record as a reference map. Each record 204 may also include a field storing the test name 212a and the level 214a assigned to the object associated with the data string 206a. In this manner, seed data records 202a-i may be created for the input objects. Seed data records 202a-i may be stored in test metadata database 200 and repeatedly loaded during the performances of tests of products in various test environments.

Modifications, additions, or omissions may be made to test metadata database 200. For example, though not explicitly shown in the depicted data, a seed data string 206a-i may reference a higher level record with which it is associated by using a special reference indicator. In one particular embodiment, for example, a record may reference a record of a higher level using a "@@@" as a special reference indicator. Thus, in the contact management application example described above, if an Office record is created in level 1, an employee record in level 2 may reference the Office record as its parent using the following key/value pair notation:

office_c===@@@Office1

In a similar manner, records 202a-i may be modified to identify a test user that is associated with creating or otherwise selecting a record. For example, the data string may be modified to include a special indicator such as the following to identify the test user:

ownerid===@@@selected_user

FIG. 3 illustrates a flowchart for the automated loading of seed data for testing in a product integration environment. The method begins at step 300 where input test data is received from a user of computer 12. In a particular environment, the input test data includes one or more object files received in a standard .csv format. The input test data may also identify a test user and/or test session to be associated with the loading of the test data.

At step 302, object identifiers and levels are assigned to the input data. As described above, for example, where the input data includes multiple nested objects such as a contact management application that might includes input objects relating to the company, the locations of company offices, and the employees within each office, a level of 1 may be assigned to the input objects relating to the company, a level of 2 may be assigned to input objects relating to the locations, and a level of 3 may be assigned to objects relating to the employees within those locations.

At step 304, the input data is converted to test database metadata. In particular, where the input data is objects of the standard .csv format, the input data within an object may be transformed into database metadata. In a particular embodiment, the database metadata for each object may include one or more data strings. Each data string may include one or more key-value pairs. An example of the conversion of input data into database metadata is described above with respect to FIG. 2.

At step 306, the database metadata is loaded to the database. In particular embodiments, a record may be created for each database metadata string. As was described above, any additional object identifiers, record identifiers, or level identifiers may be added to the record. The record may be stored in a table within test metadata database 18. Accordingly, a determination may be made at step 308 as to whether an additional user request or test session request has been received. If an additional user request or test session request has been received, the method may return to step 306. In this manner, step 306 may be repeated for each test session to be performed and/or for each user associated with a test. The data converted at step 304 may be associated with multiple user and test sessions. However, manual manipulation of the loaded data is limited to being performed only once (i.e., when it is converted into metadata at step 304) rather than each time it is loaded for a user or test session.

Modifications, additions, or omissions may be made to the flowchart. For example, it is generally recognized that step 302 may be omitted where the data is not associated with different levels. Additionally, steps in FIG. 3 may be performed in parallel or in any suitable order.

Certain embodiments of the invention may provide one or more technical advantages. For example, as stated above, a technical advantage of one embodiment may be that manual manipulation of the seed data occurs only once. Because the metadata is stored when it is originally loaded for a user or test session and then can be reused, the data is manipulated only when the input data is received rather than each time a filed is loaded for each user. As a result, a technical advantage may be that test data may be repeatedly loaded in a more efficient manner and with minimal risk of human error. Another technical advantage may be that the user interface enabling automated loading of test data may allow a testing team to load test data without engaging administrators. Additionally or alternatively, because the automated seed data loader may be built within the same application that is used for performing the tests of the seed data, no additional software may be required.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for the automated loading of seed data for testing in a product integration environment, comprising:
 a database storing at least one record comprising seed data in a seed data table; and
 a test module comprising a processor in communication with the database, the processor operable to:
  receive input data associated with a test session, the input data received in a first format comprising at least one object;
  automatically convert the input data into a second format, the second format comprising a plurality a metadata data strings, each metadata data string comprising a plurality of key value-pairs;
  assign a first portion of the plurality of metadata data strings associated with a first object type to a first level;
  assign a second portion of the plurality of metadata data strings associated with a second object type to a second level; and
  without requiring further conversion of the input data and during the performance of a plurality of performance tests, repeatedly load the first portion and the second portion of the metadata data strings into the seed data table, wherein loading the metadata data strings comprises:
   loading the first portion of the metadata data strings associated with the first level into the seed data table before the second portion of the metadata strings associated with the second level; and storing each metadata data string comprising the plurality of key-value pairs in a single field of a record in the seed data table.

2. The system of claim 1, wherein automatically converting the input data into the second format comprises:
using at least one seed data automation rule to decompose the at least one object into seed data comprising the at least one key-value pair.

3. The system of claim 1, wherein the processor is further operable to assign an object identifier to the metadata data string, the object identifier identifying a particular object within the input data.

4. The system of claim 1, wherein the processor is further operable to associate a level with the metadata string, the level identifying a level assigned to a particular object within the input data with which the metadata string is associated.

5. A method for the automated loading of seed data for testing in a product integration environment, comprising:
receiving input data associated with a test session, the input data received in a first format comprising at least one object;
using a processor to automatically convert the input data into a second format, the second format comprising a plurality of records, each record comprising a metadata data string, each metadata string comprising a plurality of key value-pairs;
assigning a first portion of the metadata strings associated with a first object type to a first level;
assigning a second portion of the metadata data strings associated with a second object type to a second level; and
without requiring further conversion of the input data and during the performance of a plurality of performance tests, repeatedly loading the first portion and the second portion of the metadata data strings into a seed data table of a database, wherein loading the metadata data strings comprises:
loading the first portion of the metadata strings associated with the first level into the seed data table before the second portion of the metadata strings associated with the second level; and
storing each metadata data string comprising the plurality of key-value pairs in a single field of a record in the seed data table.

6. The method of claim 5, wherein using the processor to automatically convert the input data into the second format comprises:
using at least one seed data automation rule to decompose the at least one object into seed data comprising the at least one key-value pair.

7. The method of claim 5, further comprising:
assigning an object identifier to the metadata data string, the object identifier identifying a particular object within the input data.

8. The method of claim 5, further comprising:
associating a level with the metadata string, the level identifying a level assigned to a particular object within the input data with which the metadata string is associated.

9. A non-transitory computer readable medium comprising logic, the logic, when executed by a processor, operable to:
receive input data associated with a test session, the input data received in a first format comprising at least one object;
automatically convert the input data into a second format, the second format comprising a plurality of meta data strings, each metadata data string comprising a plurality of key value-pairs;
assign a first portion of the plurality of metadata data strings associated with a first object type to a first level;
assign a second portion of the plurality of metadata data strings associated with a second object type to a second level; and
without requiring further conversion of the input data and during the performance of a plurality of performance tests, repeatedly load the first portion and the second portion of the metadata data strings into a seed table of a database, wherein loading the metadata data strings comprises:
loading the first portion of the metadata data strings associated with the first level into the seed data table before the second portion of the metadata data strings associated with the second level; and
storing each metadata data string comprising the plurality of key-value pairs in a single field of a record of in the seed data table, the metadata data string comprising the plurality of key value-pairs in the single field of the record of the database during the performance of a plurality of performance tests.

10. The non-transitory computer readable medium of claim 9, wherein automatically converting the input data into the second format comprises:
using at least one seed data automation rule to decompose the at least one object into seed data comprising the at least one key-value pair.

11. The non-transitory computer readable medium of claim 10, further operable to:
assign an object identifier to the metadata data string, the object identifier identifying a particular object within the input data.

* * * * *